(12) United States Patent
Wang

(10) Patent No.: US 10,628,629 B2
(45) Date of Patent: Apr. 21, 2020

(54) METHOD, DEVICE, AND CLIENT TERMINAL APPARATUS FOR DISPLAYING PAGE

(71) Applicant: GUANGZHOU UCWEB COMPUTER TECHNOLOGY CO., LTD., Guangzhou (CN)

(72) Inventor: Xiaozhen Wang, Guangzhou (CN)

(73) Assignee: GUANGZHOU UCWEB COMPUTER TECHNOLOGY CO., LTD., Guangzhou (CN)

( * ) Notice: Subject to any disclaimer, the term of this patent is extended or adjusted under 35 U.S.C. 154(b) by 206 days.

(21) Appl. No.: 15/604,405

(22) Filed: May 24, 2017

(65) Prior Publication Data
US 2018/0039603 A1    Feb. 8, 2018

(30) Foreign Application Priority Data

Aug. 8, 2016    (CN) .......................... 2016 1 0645540

(51) Int. Cl.
| | | |
|---|---|---|
| G06F 17/21 | (2006.01) |
| G06F 40/106 | (2020.01) |
| G06F 3/0485 | (2013.01) |
| G06F 3/0483 | (2013.01) |
| G06F 40/14 | (2020.01) |
| G06F 40/103 | (2020.01) |
| G06F 40/114 | (2020.01) |

(52) U.S. Cl.
CPC .......... *G06F 40/106* (2020.01); *G06F 3/0483* (2013.01); *G06F 3/0485* (2013.01); *G06F 40/103* (2020.01); *G06F 40/14* (2020.01); *G06F 40/114* (2020.01)

(58) Field of Classification Search
CPC ...... G06F 3/0483; G06F 3/0485; G06F 40/14; G06F 40/103; G06F 40/106; G06F 40/114
USPC ........................................................ 715/234
See application file for complete search history.

(56) References Cited

U.S. PATENT DOCUMENTS

| | | | | |
|---|---|---|---|---|
| 6,292,810 B1 * | 9/2001 | Richards | ............... | G06F 17/246 |
| | | | | 707/999.1 |
| 8,380,753 B2 * | 2/2013 | Mansfield | ............... | G06F 16/00 |
| | | | | 707/802 |
| 10,430,840 B2 * | 10/2019 | VanDuyn | ............... | G06F 3/0485 |
| 2011/0083082 A1 * | 4/2011 | Gottwald | ............... | G06F 16/957 |
| | | | | 715/744 |
| 2011/0126130 A1 * | 5/2011 | Lieb | ...................... | G06F 3/1454 |
| | | | | 715/753 |
| 2016/0012025 A1 * | 1/2016 | Liang | .................... | G06F 3/0484 |
| | | | | 715/234 |

(Continued)

*Primary Examiner* — Maikhanh Nguyen
(74) *Attorney, Agent, or Firm* — Anova Law Group, PLLC

(57) ABSTRACT

A method, a device and a client terminal apparatus for displaying a page including a main document and at least one external resource are provided. The method for displaying a page including a main document and at least one external resource includes comparing a first position of the at least one external resource with a second position of a current screen-displayed content, after loading of the at least one external resource is completed and adjusting a display position of the current screen-displayed content, in response to a confirmation that the first position of the at least one external resource is before the second position of the current screen-displayed content.

15 Claims, 10 Drawing Sheets

(56) References Cited

U.S. PATENT DOCUMENTS

2017/0286392 A1* 10/2017 Wang .................... G06F 40/205
2019/0073342 A1* 3/2019 Wilson .................. G06F 40/114

* cited by examiner

FIG. 5b

METHOD, DEVICE, AND CLIENT TERMINAL APPARATUS FOR DISPLAYING PAGE

CROSS-REFERENCES TO RELATED APPLICATIONS

This application claims priority of Chinese Patent Application No. 201610645540.4, filed on Aug. 8, 2016, the entire content of which is hereby incorporated by reference.

FIELD OF THE DISCLOSURE

The present disclosure generally relates to the field of webpage display and, more particularly, relates to a method, a device, and a client terminal apparatus for displaying a page.

BACKGROUND

Nowadays, mobile client terminals, such as smart phones, are often used to access the internet. People are able to browse internet content through a browser or push notifications of a variety of applications. The Internet content includes text information, image information, audio information, video information, etc. The HTML5 technology enables the interaction between the webpage and the user, substantially improving the user experience.

A webpage structure may include main document and external resources. The main document includes the web page structure and the text content within the page. The external resources include JavaScript resources, stylesheet resources, image resources and audio and video resources and other resources which need to be externally loaded. Webpage loading starts from the main document, then the external resources after the completion of the main document loading. After the main document is loaded, layout is completed, and the page is displayed to the user. If at the moment an image resource loading is completed, the browser will re-do the layout. If the position of the image is above the current scroll position, abnormal page scrolling will happen.

FIG. 1 illustrates an example of abnormal page scrolling in the existing technology. FIG. 1a shows the display status when the main document is loaded but the external resource (e.g. an image) is not loaded. The main document is loaded and displayed to the user after page layout is completed. The user scrolls the page while reading, for reading the text. FIG. 1b shows the display status when the external resource is loaded and automatic layout is completed. Although the position of the screen display itself does not change with respect to the page as a whole, the insertion of the image still causes the subsequent content to scroll down. In this example, the image height is 300 pixels, accordingly causing the subsequent content to jump down by 300 pixels. Because the user reads the part below the image, the user's intuitive feeling caused by the image loading is that the page suddenly jumps down. Accordingly, the user has to scroll up the page to get back to the original content being viewed. During reading, both the repeating sudden page jumping due to repeating image loading and the huge page jumping due to loading of a large number of images will seriously affect the user's reading experience. Unfortunately, this phenomenon is very common, especially when network speed is low or the signal is poor.

The disclosed method, device, and client terminal apparatus are directed to solve one or more problems set forth above and other problems in the art.

BRIEF SUMMARY OF THE DISCLOSURE

One aspect of the present disclosure provides a method for displaying a page including a main document and at least one external resource. The method includes comparing a first position of the at least one external resource with a second position of a current screen-displayed content, after loading of the at least one external resource is completed; and adjusting a display position of the current screen-displayed content, in response to a confirmation that the first position of the at least one external resource is before the second position of the current screen-displayed content.

Another aspect of the present disclosure provides a device for displaying a page including a main document and at least one external resource. The device includes a position comparing unit for comparing a first position of the at least one external resource with a second position of a current screen-displayed content after loading of the at least one external resource is completed; and a position adjusting unit for adjusting a display position of the current screen-displayed content in response to a confirmation that the first position of the at least one external resource is before the second position of the current screen-displayed content.

Another aspect of the present disclosure provides a client terminal apparatus for displaying a page including a main document and at least one external resource. The client terminal apparatus includes an input device for receiving an instruction inputted by a user; a display device for displaying information to the user; a memory for storing information; and a processor, connected to the input device, the display device, and the memory, and used for: comparing a first position of the at least one external resource with a second position of a current screen-displayed content after loading of the at least one external resource is completed; and adjusting a display position of the current screen-displayed content in response to a confirmation that the first position of the at least one external resource is before the second position of the current screen-displayed content.

Other aspects of the present disclosure can be understood by those skilled in the art in light of the description, the claims, and the drawings of the present disclosure.

BRIEF DESCRIPTION OF THE DRAWINGS

The above and other objects, features and advantages of the present disclosure will be more apparent through the following detailed description of exemplary embodiments of the present disclosure with reference to the accompanying drawings, in which the same reference numerals generally refer to the same parts.

FIG. 5b illustrates a same page in FIG. 5a in which only the main document is included but the external resources have not been loaded consistent with disclosed embodiments;

DETAILED DESCRIPTION

Figure 1A:
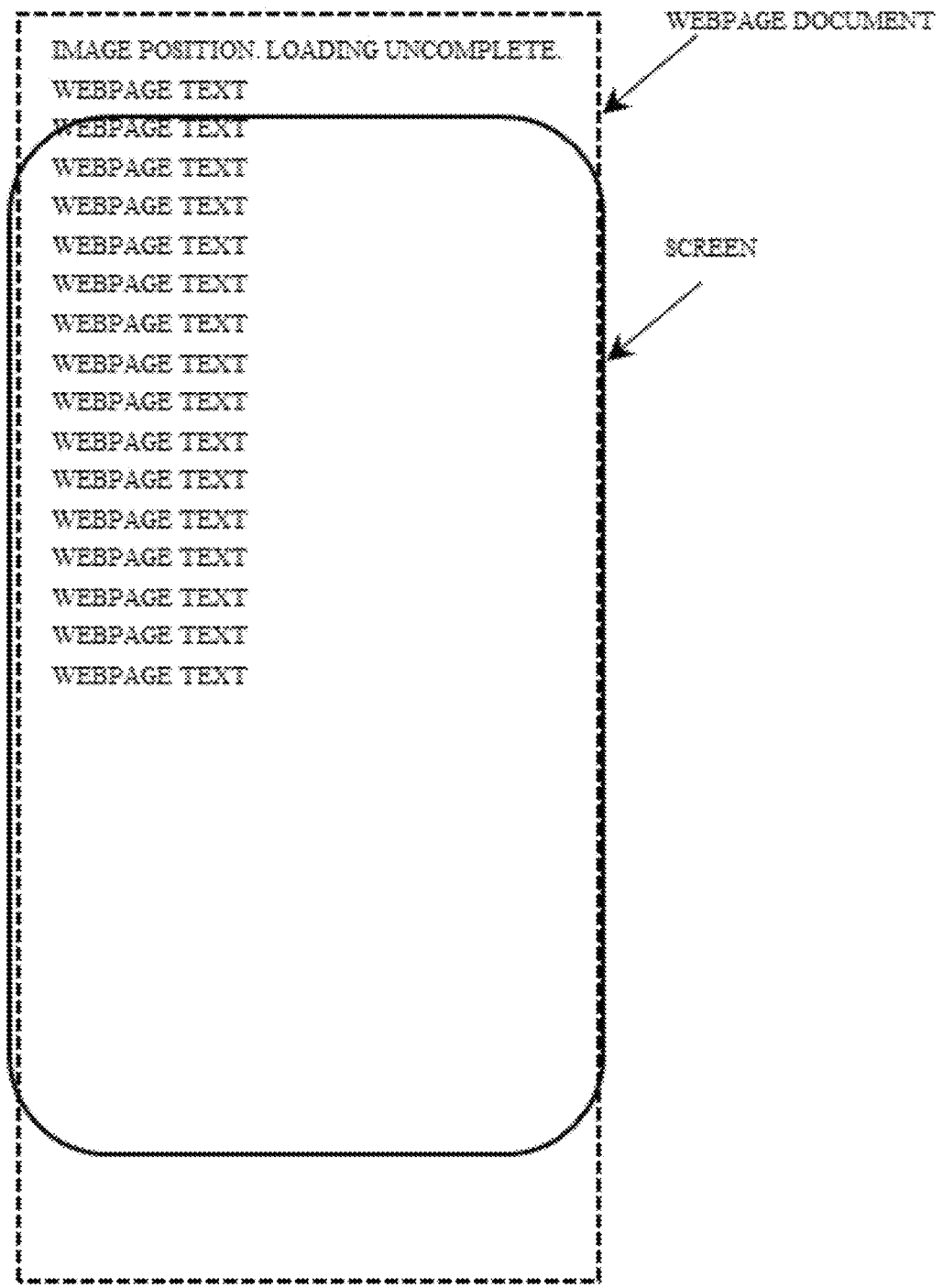
FIG. 1a shows a display status when a main document is loaded but an external resource is not loaded.
Figure 1B:
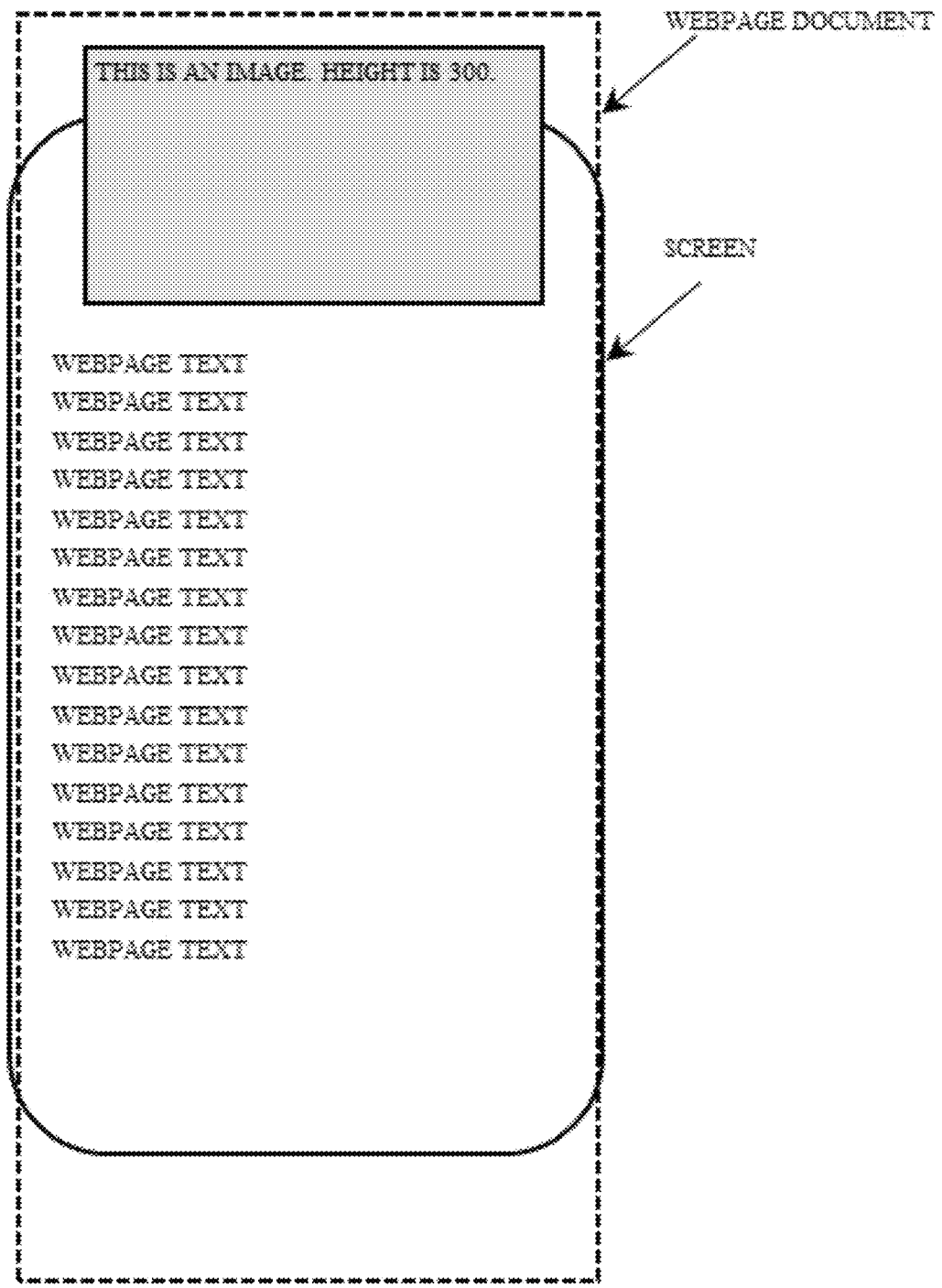
FIG. 1b shows a display status when an external resource is loaded and automatic layout is completed.

Hereinafter, various embodiments of the present disclosure will be described in more detail with reference to the accompanying drawings. While various embodiments of the present disclosure are shown in the drawings, it should be understood that the present disclosure may be implemented in various forms and should not be limited to the embodiments set forth herein. Rather, the embodiments are provided in order to make the disclosure more thorough and complete, and to fully convey the scope of the present disclosure to those skilled in the art.

When the external resource before the current content being browsed is loaded, re-layout may happen because the new content is inserted before the current content. Accordingly, abnormal page scrolling may happen. The abnormal page scrolling may interrupt the reading fluency of the user. In particular, when a large number of external resources are loaded, reading may be completely interrupted, resulting in a substantially poor user experience. Accordingly, in the disclosed embodiments, the page position that the user is currently viewing may be determined according to a height of the current webpage position. During the re-layout of the page, if the re-layout influences the page position where the user is currently viewing, the coordinate of the page position in the new page may be recalculated, and the page may be scrolled to the page position being view by the user prior to the re-layout. Accordingly, the problem of page scrolling due to re-layout may be solved.

A page to be displayed may include the main document and external resources. The main document may include the webpage structure and the text content within the page. The external resources may include JavaScript resources, style sheet resources, image resources and audio and video resources and other resources which need to be externally loaded. Webpage loading may start from the main document, then the external resources may be loaded separately (e.g. loaded in a proper order) after the completion of the main document loading. After the main document is loaded, layout is completed, and the page is displayed to the user. If at the moment an image resource loading is completed, the browser or other applications used to display the page may carry out re-layout.

Figure 2:
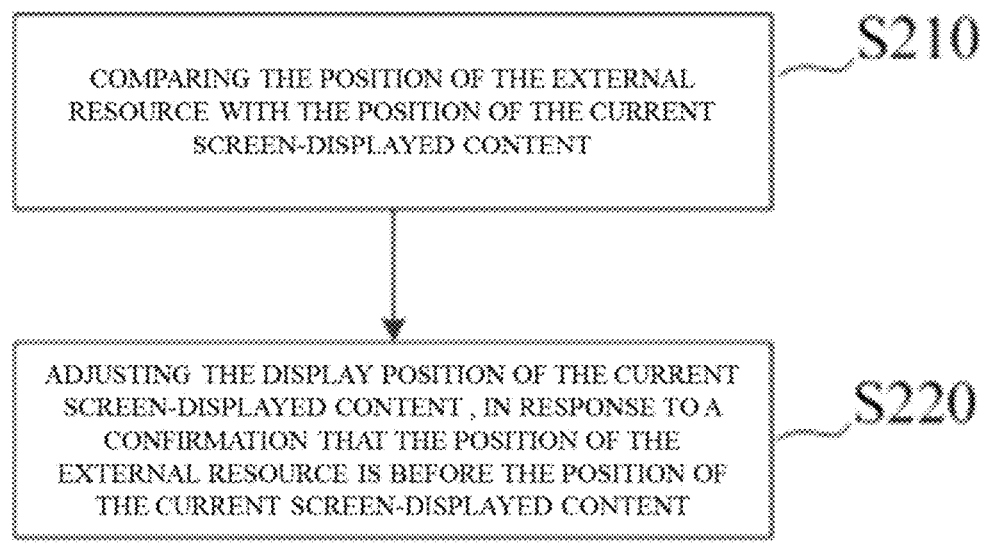
FIG. 2 illustrates a schematic view of an exemplary page display method consistent with disclosed embodiments.

FIG. 2 illustrates a schematic view of an exemplary page display method consistent with disclosed embodiments. In step S210, when the loading of an external resource is completed, the first position where the external resource is located may be compared with the second position where the current screen-displayed content is located.

In step S220, in response to the confirmation that the first position is before the second position, the display position of the current screen-displayed content may be adjusted. That is, as long as the position where the external resource is inserted is before the content being browsed by the user prior to loading of the external resource, loading of the external resource may cause the browsed content of the user to move down on the screen. Thus, the screen-displayed position may have to be adjusted to compensate the downward moving. In one embodiment, the adjustment may include moving the current screen-displayed position down by the height of the external resource to be downloaded.

Here the first position where the external resource is located may be the first position of the external resource relative to the main document, and the second position where the current screen-displayed content is located may be the current screen-displayed content relative to the main document. In addition, adjusting the position of page content may include adjusting the display position of the main document. Thus, through comparing and adjusting positions with respect to the main document, operations may be carried out more intuitively and conveniently to determine whether or not the adjustment is necessary. For example, if a position of the height of the document node corresponding to the loaded image (i.e., the vertical coordinate of the document node relative to the main document) is lower than a position of the height of the current document (i.e., the vertical coordinate of the upper screen relative to the main document), it can be determined that the screen-displayed position may have to be adjusted.

In addition, the first position where the external resource is located may also be the position of the external resource in the main document which has been loaded and may be represented by a distance (e.g. pixel number) between the position where the external resource is inserted and the beginning position of the page, and may also be the position of the external resource in the page which is currently being loaded. Accordingly, the second position where the current screen-displayed content is located may also be a position of a part of currently displayed scrollable resources (e.g., the first line of text or the top pixels) in the main document which has been loaded. For example, the second position where the current screen-displayed content is located may also be represented by a distance between the part of currently displayed scrollable resources and the beginning position of the page (e.g. pixel number). The second position where the current screen-displayed content is located may also be a position of the current screen-displayed content in the page which is being loaded.

That is, the first position and the second position may be defined with respect to the main document or the page that is being loaded. What really matter may be whether the position where the external resource is inserted is located before or after the content being browsed by the user prior to loading of the external resource.

Further, based on the comparative results, the display position of the current screen-displayed content may be adjusted by adjusting the current screen-displayed position of the main document or adjusting the current screen-displayed position of the document after loading of the external resource.

The influence of the repeatedly loaded external resources may be eliminated by defining the first and second positions with respect to the main document and subsequently adjusting the display position of the main document according to the comparative results. Thus, in one embodiment, the reference for position definition and adjustment may be the main document.

In addition, the position where the external resource is located may refer to the height value in the vertical coordinate where the external resource is inserted. The position of the current screen-displayed content may refer to, for example, the height value in the vertical coordinate where the first row of pixels of the current screen-displayed content are located. Here the direction of the vertical coordinate is same as the top-down layout of the document.

When two or more external resources are loaded almost simultaneously, the first position of each of the two or more external resources relative to the main document may have to be compared with the second position of the current screen-displayed document relative to the main document, and in response to a confirmation that at least one first position of at least one external resource relative to the main document is before the second position of the current screen-displayed document relative to the main document, the display position of the current screen-displayed content may be adjusted.

For example, three images in the page may be loaded successively due to sudden improvement on the network status, and may be inserted into the page display in a same re-layout. Accordingly, whether each of the three images is located before the position being viewed by the user may have to be determined. As long as one image is before the position being viewed by the user, the screen display may have to be adjusted. In one embodiment, the display position of the current screen-displayed content may be adjusted by moving down by a total height of the external resource(s) that need to be inserted before the position being viewed. For example, if two images need to be inserted before the position being viewed by the user, the display position of the current screen-displayed content may have to be moved down by a total height of the two images, to compensate the page jumping. Accordingly, reasonable response may be provided to problems such as the huge page jumping due to the almost simultaneous loading of a large number of external resources when the network status suddenly improves.

In the process of user reading, the external resources may be loaded repeatedly. Thus, in the process of reading a complete page by the user, as the external resources such as images are loaded one by one, the disclosed technical solution for displaying a webpage may be implemented repeatedly to constantly compensate the page jumping due to the insertion of new resources.

The disclosed technical solution may be well applicable to a screen with a limited width. In one embodiment, the page may be displayed by a single column display of the main document and the external resources from top to bottom, e.g. browsing a webpage or viewing various pushed articles with a smartphone. Accordingly, the disclosed technical solution may also be well applicable to applications such as mobile browsers and other page display applications.

In another embodiment, the page may also be displayed by a block display of the main document and the external resources, such as what may be commonly seen when a computer browser browses portal websites. Although the influence of page jumping on the reading experience in the block display may not be as significant as in the single column display, the improvement in page jumping may still be able to improve the user's reading experience. Thus, the disclosed technical solution for displaying a page may be adopted in large screen mobile clients such as tablet computers and the like, and further in personal computers.

In this case, the position comparison may include, for example, the comparison between a height of the position of the upper left block of the current screen-displayed content and a height of the position of the resource to be loaded, and may be the comparison between a height of the position of the column where the current screen-displayed block is located and a height of the position of the resource to be loaded. A height of the position here may refer to the vertical distance measured from the beginning position of the page and along the page scrolling direction.

The page display method consistent with the disclosed embodiments of the present disclosure has been hereinbefore described with reference to FIG. 2. The respective page display device and client terminal apparatus will now be described below with reference to the accompanying FIG. 3 and FIG. 4.

Figure 3:
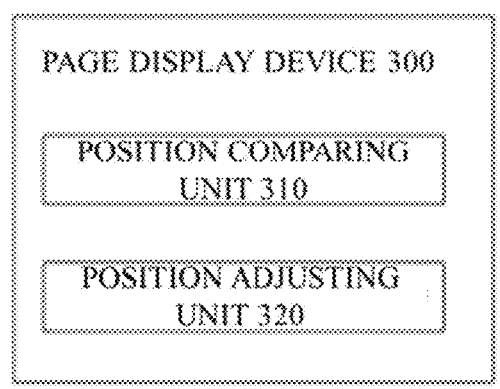
FIG. 3 illustrates a schematic view of an exemplary page display device consistent with disclosed embodiments.

FIG. 3 illustrates a schematic view of an exemplary page display device consistent with disclosed embodiments. The page display device 300 may include a position comparing unit 310 and a position adjusting unit 320. The position comparing unit 310 may compare the first position of the external resource relative to the main document with the second position of the current screen-displayed document relative to the main document when the external resource has been loaded. The position adjusting unit 320 may adjust the display position of the current screen-displayed content in response to the confirmation that the first position is before the second position. In one embodiment, the position adjusting unit 320 may move the current screen-displayed position down by the height of the external resource in response to the confirmation that the first position is before the second position.

Similarly, the position comparing unit 310 and the position adjusting unit 320 may also carry out proper operations for simultaneous loading or successive loading of a plurality of external resources, which will not be further described here.

Figure 4:
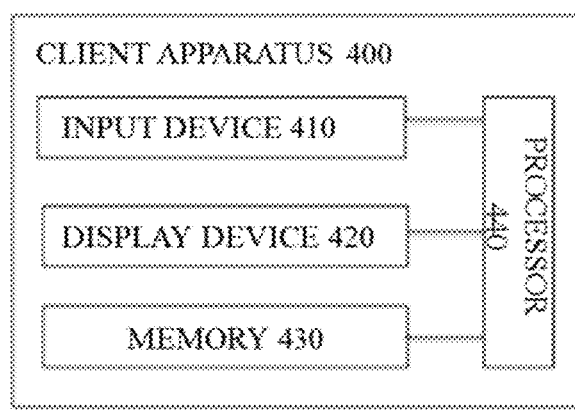
FIG. 4 illustrates a schematic view of an exemplary client terminal apparatus consistent with disclosed embodiments.

FIG. 4 illustrates a schematic view of an exemplary client terminal apparatus consistent with disclosed embodiments. The client terminal apparatus 400 may include an input device 410, a display device 420, a memory 430, and a processor 440.

The input device 410 may receive an instruction from a user, the display device 420 may display information to the user, and the memory 430 may be used for storing the information. The processor 440 may be connected to the input device 410, the display device 420, and the memory 430, and may be capable of executing the page display method of the present disclosure. For example, the processor 440 may be used for: comparing the first position of the external resource relative to the main document with the second position of the current screen-displayed document relative to the main document when the external resource has been loaded; adjusting the display position of the current screen-displayed content in response to the confirmation that the first position is before the second position. In one embodiment, the processor 440 may move the current screen-displayed position down by the height of the external resource in response to the confirmation that the first position is located before the second position.

The disclosed page display method, page display device and client terminal apparatus have been hereinbefore described with reference to the accompanying figures. The principles of the present disclosure will be more intuitively illustrated below in conjunction with various application examples.

In one application example, if a position of the height of the document node corresponding to the loaded image (i.e. the vertical coordinate of the document node relative to the main document) is lower than a position of the height of the current document (i.e. the vertical coordinate of the upper screen relative to the main document), then the screen-displayed position may be adjusted. Here, a position of the height may refer to the distance from the starting point of the page in a top-down single-column display, and the position of the starting point may be set as 0. First, the current position height $y_0$ may be recorded. When the image has been loaded, due to the layout action of the loaded image, the main document may re-do the layout. After the layout of the main document is completed, the module may acquire the layout height (h) of the element corresponding to the image. The module may recalculate the new position height y, where $y=y_0+h$. The module may set the position height in the main document to y, thereby avoiding page jumping due to image loading at the position before the viewed content prior to the image loading.

FIG. 5 illustrates an exemplary page display application on a mobile terminal consistent with disclosed embodiments. FIG. 5a illustrates the page in which the external resources have been loaded, including image 1 and image 2. FIG. 5b illustrates the same page in which only the main document is included but the external resources have not been loaded for various reasons (such as poor network condition). Due to the limited height of the screen, generally the page content may not be completely displayed in a single screen. Thus, as shown in FIG. 5c, the initial display of the page content may be a portion of the page content starting from the title, including the header portion that does not change by scrolling and the webpage document portion that is able to scroll. The user may then browse the subsequent content of the article by flicking the screen up (i.e., the downward movement of the screen-displayed position) as shown in FIG. 5d.

Figure 5A:
FIG. 5a illustrates an exemplary page in which the external resources have been loaded consistent with disclosed embodiments.
Figure 5A:
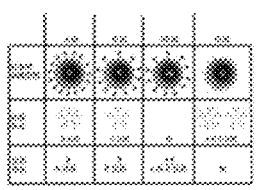
Figure 5B:
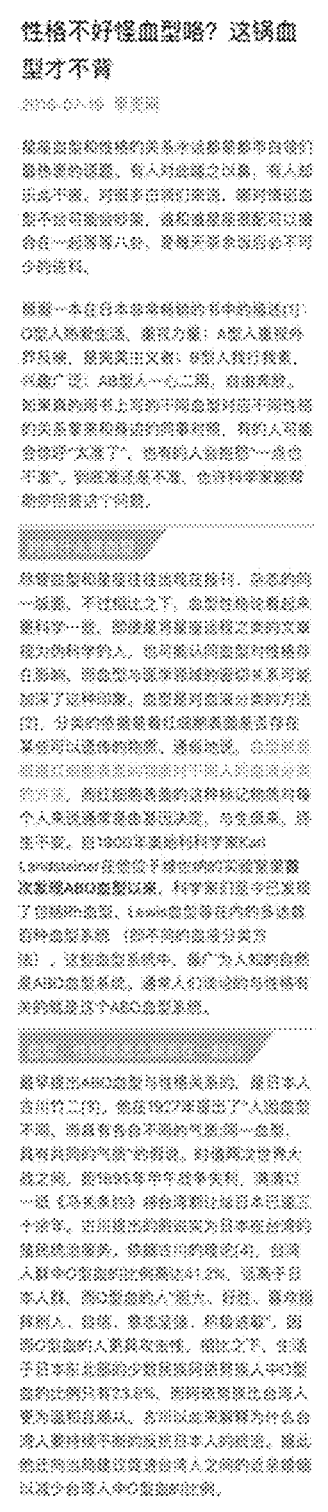
Figure 5C:
FIG. 5c illustrates an initial display of page content consistent with disclosed embodiments.
Figure 5D:
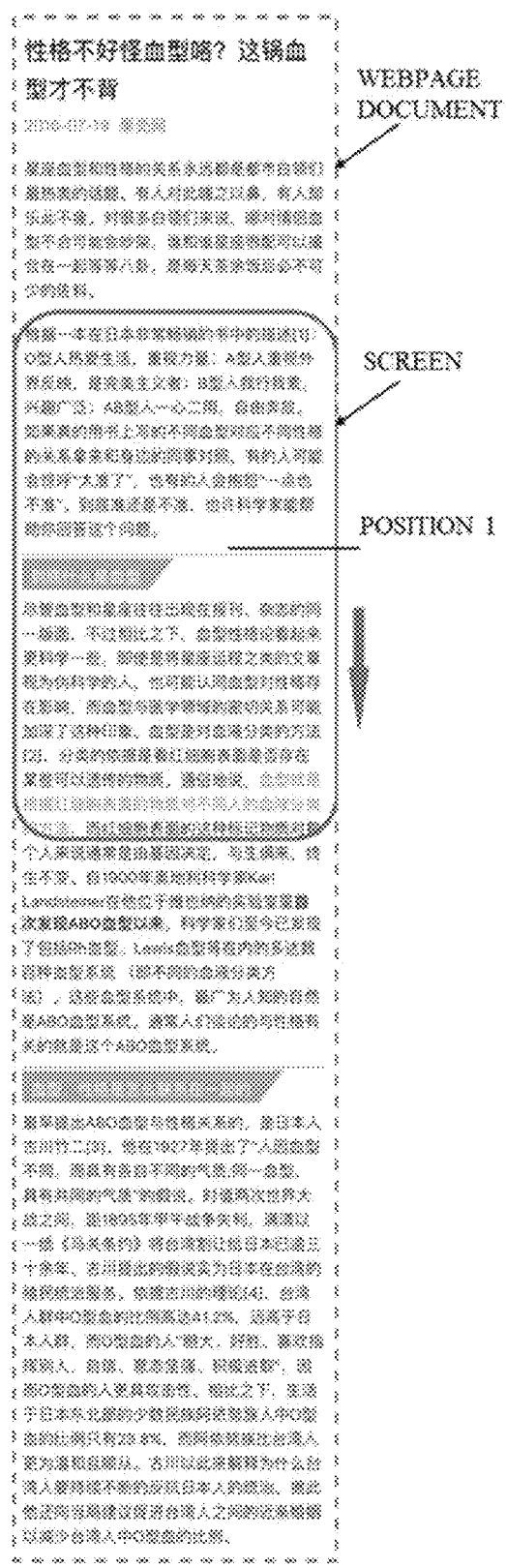
FIG. 5d illustrates subsequent content of an article by flicking the screen up consistent with disclosed embodiments.
Figure 5E:
FIG. 5e illustrates a position that a user has read consistent with disclosed embodiments.
Figure 5F:
FIG. 5f illustrates that loading of an image causes subsequent content to move down with respect to the position in FIG. 5e consistent with disclosed embodiments.

Then, if image 1 has been loaded and causes the page to re-do layout, the insertion of the image may have no influence on the user as long as the user has not read the position where image 1 is inserted (position 1 in FIG. 5d) or below. For example, regardless of whether the image is loaded, if the user is still browsing the display content in FIG. 5c, the browsing may not be influenced by the image loading. Even if the user has read the position of FIG. 5e, the loading of image 1 may cause the subsequent content to move down (as shown in FIG. 5f). However, because the upper half of the page (at least the first row of pixel content of the scrollable portion) does not change, it may be determined that the insertion of image 1 may have no influence on the user reading fluency.

Figure 5G:
FIG. 5g-5h illustrates that insertion of an image causes content viewed to jump down consistent with disclosed embodiments.
Figure 5H:

But if the user has read the position 1 or below (for example, the first row of pixels in the webpage document portion currently displayed in the screen is at the position 1 or below), the insertion of image 1 may cause the page portion which the user is viewing to move down. As shown in FIG. 5g, assuming that the user has read a position below position 1 prior to the loading of image 1, the insertion of image 1 may cause the content viewed by the user to jump down, as shown in FIG. 5h. At this moment, for example, when the image has been loaded and re-layout is being carried out, the display position of the current screen-displayed content may be adjusted according to the disclosed technical solution. For example, the current screen-displayed position may be moved down by the height of the image 1, thereby compensating the page jumping due to the insertion of image 1 and causing the screen display to return to the content shown in FIG. 5g. Because the moving-back action is able to happen almost simultaneously with the re-layout due to image loading, the user may visually notice no change in displayed content (in other words, the adjustment may be implemented in a transparent manner to the user).

Similarly, when image 2 is loaded, whether and how to adjust the screen display may be determined according to the user's current reading position, based on the disclosed technical solution.

In summary, by adopting the disclosed technical solution, a new position in the main document may be configured accordingly after the image has been loaded and layout has been completed. The entire operation may cause no page scrolling effect. Thus, even if the image is just inserted, the page position may show no change to the user, such that the continuity of user reading may be improved, and the reading experience may be improved.

A method, a device and a client terminal apparatus for displaying a page may be provided in the present disclosure. The page to be displayed may include a main document and at least one external resource. The page display method may include: comparing a first position where the at least one external resource is located with a second position where a current screen-displayed content is located after loading of the at least one external resource is completed; and adjusting a display position of the current screen-displayed content, in response to a confirmation that the first position is before the second position. In one embodiment, the position determining and display adjusting may be carried out with respect to the main document. By adjusting the screen-displayed position, page jumping due to a sudden insertion of the at least one external resource may be compensated, and accordingly a smooth user browsing may be ensured.

Although the insertion of image resources is illustrated, the external resources may also include JavaScript resources, style sheet resources and audio and video resources and other resources which need to be externally loaded. The disclosed page display technical solution may also be adopted to compensate the page jumping due to loading of the various external resources.

In addition, the disclosed method of the present disclosure may also be implemented as a computer program including computer program code instructions for performing the above steps defined in the above method of the present disclosure, or may also be implemented as a computer program product which includes a computer readable storage medium (or media) having computer readable program thereon for performing the above functions defined in the above method of the present disclosure. Those skilled in the art will also understand that the various illustrative logical blocks, modules, circuits and algorithm steps described in combination with the contents disclosed herein may be implemented as an electronic hardware, computer software or combinations of electronic hardware and computer software.

The flowchart and block diagrams in the figures illustrate the architecture, functionality, and operation of possible implementations of systems and methods according to various embodiments of the present disclosure. In this regard, each block in the flowchart or block diagrams may represent a module, segment, or portion of instructions, which includes one or more executable instructions for implementing the specified logical function(s). It should be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It should also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for displaying a single-column page from a top to a bottom, including a main document and at least one external resource, the method comprising:
   comparing a first position of the at least one external resource with a second position of a current screen-displayed content, after loading of the at least one external resource is completed, wherein the first position is a position where the at least one external resource is inserted in the page with respect to the top of the page, and the second position is a position of a first line of the current screen-displayed content with respect to the top of the page;
   adjusting, simultaneously with a re-layout of the single-column page, a current screen-displayed position by moving a height of the at least one external resource to the bottom, in response to a confirmation that the first position of the at least one external resource is before the second position of the current screen-displayed content, wherein a distance between a first line of the current screen-displayed content after the adjustment and the first line before the adjustment is equal to the height of the at least one external resource, the at least one external resource includes two or more external resources; comparing a first position of each of the two or more external resources with the second position of the current screen-displayed content, after loading of the two or more external resources is completed; and
   in response to a confirmation that at least one first position of the two or more external resources is before the second position of the current screen-displayed content, moving the display position of the current screen-displayed content down by a total height of the two or more external resources corresponding to the at least one first position.

2. The method according to claim 1, wherein:
   the first position of the at least one external resource is a position of the at least one external resource relative to the main document,
   the second position of the current screen-displayed content is a position of the current screen-displayed content relative to the main document, and
   adjusting the display position of the current screen-displayed content includes adjusting a display position of the main document.

3. The method according to claim 1, wherein the page is displayed by a single column display of the main document and the at least one external resource from the top to the bottom.

4. The method according to claim 1, wherein the page is displayed by a block display of the main document and the at least one external resource.

5. A device for displaying a single-column page from a top to a bottom, including a main document and at least one external resource, the device comprising one or more processors, wherein the one or more processors are configured to:
   compare a first position of the at least one external resource with a second position of a current screen-displayed content after loading of the at least one external resource is completed, wherein the first position is a position where the at least one external resource is inserted in the page with respect to the top of the page, and the second position is a position of a first line of the current screen-displayed content with respect to the top of the page;
   adjust, simultaneously with a re-layout of the single-column page, a current screen-displayed position by moving a height of the at least one external resource to the bottom in response to a confirmation that the first position of the at least one external resource is before the second position of the current screen-displayed content, wherein a distance between a first line of the current screen-displayed content after the adjustment and the first line before the adjustment is equal to the height of the at least one external resource, the at least one external resource includes two or more external resources; compare a first position of each of the two or more external resources with the second position of the current screen-displayed content, after loading of the two or more external resources is completed; and
   in response to a confirmation that at least one first position of the two or more external resources is before the second position of the current screen-displayed content, move the display position of the current screen-displayed content down by a total height of the two or more external resources corresponding to the at least one first position.

6. The device according to claim 5, wherein the one or more processors are further configured to:
   move a current display position down by the height of the at least one external resource in response to the confirmation that the first position of the at least one external resource is before the second position of the current screen-displayed content.

7. The device according to claim 5, wherein the one or more processors are further configured to:
   compare the first position of the at least one external resource relative to the main document with the second position of the current screen-displayed content relative to the main document after loading of the at least one external resource is completed.

8. The device according to claim 5, wherein the page is displayed by a single column display of the main document and the at least one external resource from the top to the bottom.

9. The device according to claim 5, wherein the page is displayed by a block display of the main document and the at least one external resource.

10. A client terminal apparatus for displaying a page from a top to a bottom including a main document and at least one external resource, the client terminal apparatus comprising:
- an input device for receiving an instruction from a user;
- a display device for displaying information to the user;
- a memory for storing information; and
- a processor, connected to the input device, the display device, and the memory, and configured for:
- comparing a first position of the at least one external resource with a second position of a current screen-displayed content after loading of the at least one external resource is completed, wherein the first position is a position where the at least one external resource is inserted in the page with respect to the top of the page, and the second position is a position of a first line of the current screen-displayed content with respect to the top of the page;
- adjusting, simultaneously with a re-layout of the single-column page, a current screen-displayed position by moving a height of the at least one external resource to the bottom in response to a confirmation that the first position of the at least one external resource is before the second position of the current screen-displayed content, wherein a distance between a first line of the current screen-displayed content after the adjustment and the first line before the adjustment is equal to the height of the at least one external resource, the at least one external resource includes two or more external resources;
- comparing a first position of each of the two or more external resources with the second position of the current screen-displayed content, after loading of the two or more external resources is completed; and
- in response to a confirmation that at least one first position of the two or more external resources is before the second position of the current screen-displayed content, moving the display position of the current screen-displayed content down by a total height of the two or more external resources corresponding to the at least one first position.

11. The client terminal apparatus according to claim 10, wherein:
- the processor moves a current display position down by the height of the at least one external resource in response to the confirmation that the first position of the at least one external resource is before the second position of the current screen-displayed content.

12. The client terminal apparatus according to claim 10, wherein:
- the processor compares the first position of the at least one external resource relative to the main document with the second position of the current screen-displayed content relative to the main document after loading of the at least one external resource is completed.

13. The client terminal apparatus according to claim 10, wherein the page is displayed by a single column display of the main document and the at least one external resource from the top to the bottom.

14. The client terminal apparatus according to claim 10, wherein the page is displayed by a block display of the main document and the at least one external resource.

15. The client terminal apparatus according to claim 10, wherein:
- the first position of the at least one external resource is a position of the at least one external resource relative to the main document,
- the second position of the current screen-displayed content is a position of the current screen-displayed content relative to the main document, and
- adjusting the display position of the current screen-displayed content includes adjusting a display position of the main document.

* * * * *